(12) United States Patent
Neymark et al.

(10) Patent No.: US 11,586,719 B1
(45) Date of Patent: Feb. 21, 2023

(54) APPARATUSES AND METHODS FOR VERIFIED APPLICATION ACCESS

(71) Applicant: Wells Fargo Bank, N.A., San Francisco, CA (US)

(72) Inventors: Anatoliy Neymark, Castro Valley, CA (US); Brandon Robert Dresch, Charlotte, NC (US); Minh H. Dang, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 59 days.

(21) Appl. No.: 17/032,481

(22) Filed: Sep. 25, 2020

(51) Int. Cl.
*G06F 21/44* (2013.01)
*G06F 21/33* (2013.01)

(52) U.S. Cl.
CPC ............ *G06F 21/445* (2013.01); *G06F 21/33* (2013.01)

(58) Field of Classification Search
CPC ..... H04L 63/10; H04L 63/12; H04L 63/1433; H04L 63/20; H04L 43/0817; G06F 21/6218; G06F 21/31; G06F 21/45; G06F 2221/0713; H04W 12/06; H04W 12/08
See application file for complete search history.

(56) References Cited

U.S. PATENT DOCUMENTS

| | | | | |
|---|---|---|---|---|
| 8,204,809 B1* | 6/2012 | Wise | ...................... | G06Q 40/06 705/36 R |
| 9,077,745 B1* | 7/2015 | Kline | .................... | G06F 21/577 |
| 9,948,681 B1* | 4/2018 | Kruse | ..................... | H04L 63/20 |
| 11,393,021 B1* | 7/2022 | Riley | ................... | G06Q 50/265 |
| 2011/0237227 A1 | 9/2011 | Kemery et al. | | |
| 2011/0270698 A1* | 11/2011 | Gunther | ............ | G06Q 30/0601 705/40 |
| 2012/0066017 A1* | 3/2012 | Siegel | .................... | G06Q 10/06 705/7.14 |

(Continued)

FOREIGN PATENT DOCUMENTS

WO 2019/200350 A1 10/2019

OTHER PUBLICATIONS

"Homey app for Chores, Rewards and Allowances—Homey app for Families", [retrieved from Internet on Mar. 6, 2020], <URL:http://homeyapp.net/>, dated (2017).

(Continued)

*Primary Examiner* — Lizbeth Torres-Diaz
(74) *Attorney, Agent, or Firm* — Womble Bond & Dickinson

(57) ABSTRACT

Methods, apparatuses, and computer program products are disclosed for providing verified application access. An example method includes an access request for a first user device associated with a first user profile and determining an application associated with the access request. The example method further includes generating an evaluation element that includes testable content associated with the determined application and determining of the evaluation element by the first user device. In response to completion of the evaluation element by the first user device, the method includes providing access to the application for the first user device. The method also may include modifying the testable content of the evaluation element based upon one or more user parameters of the first user profile received from a user parameter database.

20 Claims, 6 Drawing Sheets

(56) References Cited

U.S. PATENT DOCUMENTS

| | | | | |
|---|---|---|---|---|
| 2014/0201814 | A1* | 7/2014 | Barkie | H04L 63/0892 |
| | | | | 726/4 |
| 2017/0012983 | A1* | 1/2017 | Smith | H04L 63/0876 |
| 2017/0034023 | A1* | 2/2017 | Nickolov | H04L 43/0817 |
| 2017/0076623 | A1* | 3/2017 | Grimes | G09B 7/08 |
| 2018/0359244 | A1* | 12/2018 | Cockerill | H04L 63/0823 |
| 2019/0184919 | A1* | 6/2019 | Kamini | B60H 1/00985 |
| 2021/0201328 | A1* | 7/2021 | Gunther | G06Q 20/4016 |

OTHER PUBLICATIONS

Rooster Money "Kids Allowances. Sorted." [retrieved from the Internet on Oct. 1, 2020], <URL:https://roostermoney.com/us/>, dated (2020).

* cited by examiner

APPARATUSES AND METHODS FOR VERIFIED APPLICATION ACCESS

TECHNOLOGICAL FIELD

Example embodiments of the present disclosure relate generally to access controls and, more particularly, to evaluating and verifying users prior to and during application access.

BACKGROUND

Financial institutions and other businesses offer a variety of products (e.g., credit cards, savings accounts, mortgages, or the like) to their customers. Some of these products may be targeted to certain groups of customers (e.g., homeowners, parents, retirees, etc.) while other products may generally be made available to all customers. Failure to be properly educated regarding the terms and conditions of these products, however, may result in unplanned fees, termination of service, or other adverse consequences for a user.

BRIEF SUMMARY

As described above, many financial institutions offer financial products (e.g., credit cards, mortgages, savings accounts, checking accounts, debit cards, or the like) for their customers that include various terms and conditions that govern their use. For example, a credit card may include a credit limit, annual percentage rate (APR) or interest rate, minimum payment amount, etc. that limit how the credit card may be used and/or define the costs associated with such use. For many users, such as first time credit card owners, however, these terms and conditions may be unfamiliar, and these users may incur unintended fees for use outside of these terms and conditions. Additionally, many parents are looking to improve the financial literacy of their children by providing access to various financial products either tied to their own accounts or in the form of independent accounts for their children. Current financial products, accounts, and applications, however, often provide unfettered access to an account owner and/or application user. As such, these conventional products and systems fail to ensure sufficient user competency related to the particular financial product or application prior to providing access to such product or application. Said differently, although the terms and conditions of a financial product may be varied (e.g., credit limit, minimum balance requirements, and the like), conventional financial products and applications fail to educate users prior to and during access.

To solve these issues and others, example implementations of embodiments of the present disclosure may utilize evaluation elements that include testable content relating to requested application access to ensure verified application access. In operation, embodiments of the present disclosure may receive an access request for a first user device associated with an application to be accessed. The system may generate an evaluation element that includes testable content associated with the application and determine completion of the evaluation element by the first user device before providing access to the application. Additionally, example embodiments may further leverage user parameters to modify, augment, or otherwise inform the generation of the evaluation element so as to dynamically customize testable content to a particular user profile and application request. Furthermore, during access embodiments of the present disclosure may monitor user action to ensure compliance with various limitation parameters associated with the access (e.g., spending limits, timing limits, etc.) and may generate a reevaluation element in instances in which a user action fails to comply with these limitations. In this way, the inventors have identified that the advent of new account technologies have created a new opportunity for solutions for verifying application access which were historically unavailable. In doing so, such example implementations confront and solve at least two technical challenges: (1) they reliably verify access requests prior and during application access, and (2) they enable and improve device interoperability in the context of account controls.

Systems, apparatuses, methods, and computer program products are disclosed herein for providing verified application access. With reference to an example method, a method for providing verified application access may include receiving, via a computing device, an access request for a first user device associated with a first user profile and determining, via content circuitry of the computing device, an application associated with the access request. The method may include generating, via the content circuitry of the computing device, an evaluation element comprising testable content associated with the determined application and determining, via verification circuitry of the computing device, completion of the evaluation element by the first user device. In response to determination of completion of the evaluation element, the method may include providing, via access circuitry of the computing device, access to the application for the first user device.

In some embodiments, generating the evaluation element may include querying, via the content circuitry, a user parameter database comprising one or more user parameters associated with the first user profile. In such an embodiment, the method may include modifying, via the content circuitry, the testable content associated with the evaluation element based upon the one or more user parameters.

In some embodiments, determining completion of the evaluation element may include providing, via the verification circuitry, the evaluation element to the first user device. In an instance in which the computing device receives a responsive evaluation element from the first user device that satisfies a competency threshold, the method may include determining, via the verification circuitry, completion of the evaluation element. In an instance in which the computing device receives a responsive evaluation element from the first user device that fails to satisfy the competency threshold, the method may include determining, via the verification circuitry, failure of the evaluation element.

In some further embodiments, the method may further include preventing, via the access circuitry, access of the first user device to the application in response to the determining failure of the evaluation element. In such an embodiment, the method may also include transmitting, via the computing device, a failure notification to a second user device associated with a second user profile.

In other embodiments, the application access provided to the first user device comprises one or more limitation parameters. In such an embodiment, the method may further include determining, via the verification circuitry, action by the first user device in violation of at least one limitation parameter and halting, via access circuitry of the computing device, access to the application for the first user device. In such an embodiment, the method may further include generating, via the content circuitry, a reevaluation element comprising testable content associated with the application as modified by action of the first user device.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
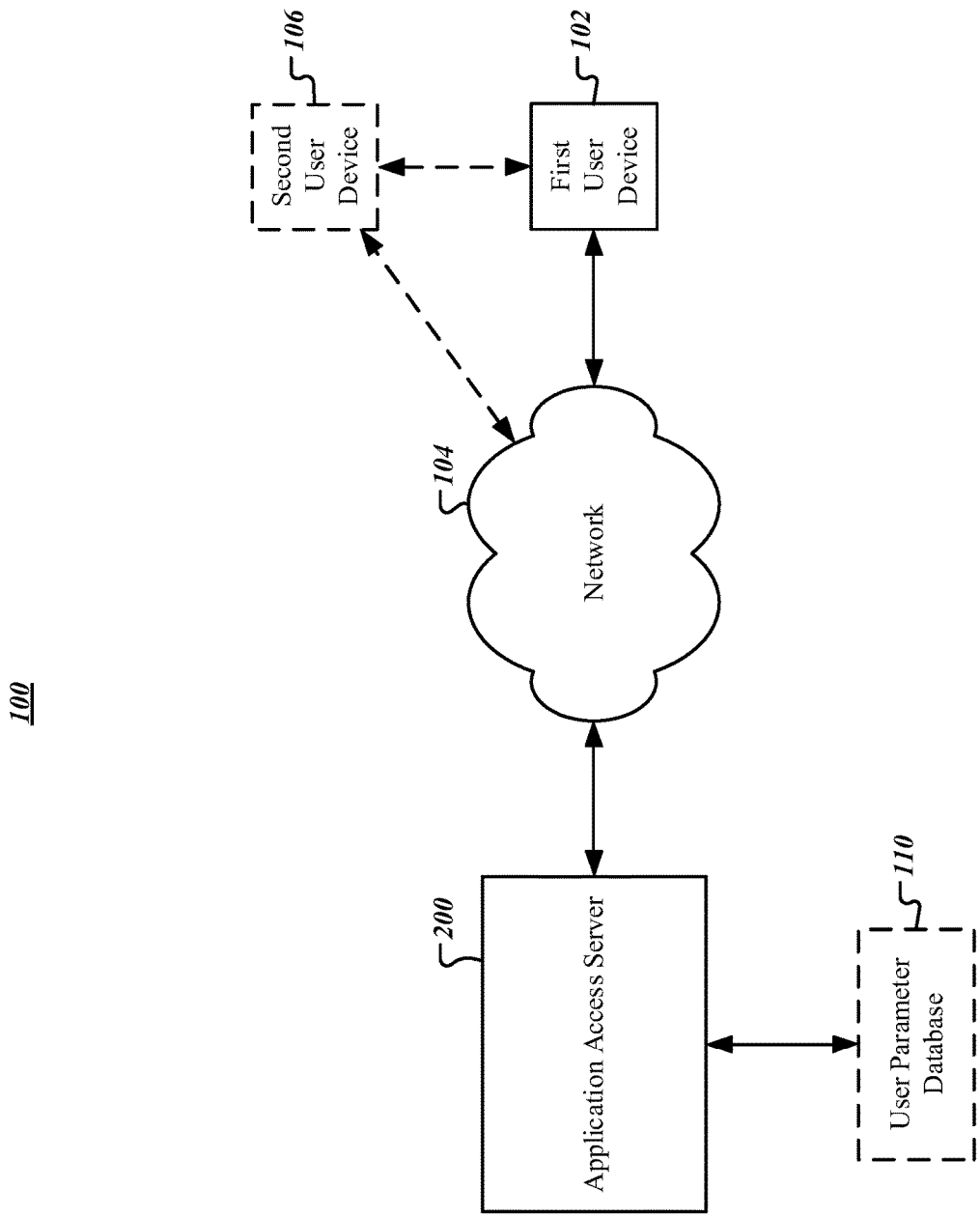
FIG. 1 illustrates a system diagram including devices that may be involved in some example embodiments described herein.

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the description may refer to an application access server as an example "apparatus." However, elements of the apparatus described herein may be equally applicable to the claimed method and computer program product. Thus, use of any such terms should not be taken to limit the spirit and scope of embodiments of the present invention.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used to mean "serving as an example, instance, or illustration." Any implementation described herein as "example" is not necessarily to be construed as preferred or advantageous over other implementations.

As used herein, the terms "user device," "mobile device," "electronic device" and the like refer to computer hardware that is configured (either physically or by the execution of software) to access one or more services made available by an application access server (e.g., apparatus or computing device of the present disclosure) and, among various other functions, is configured to directly, or indirectly, transmit and receive data. Example user devices may include a smartphone, a tablet computer, a laptop computer, a wearable device (e.g., smart glasses, smart watch, or the like), and the like. In some embodiments, a user device may include a "smart device" that is equipped with a chip or other electronic device that is configured to communicate with the apparatus via Bluetooth, NFC, Wi-Fi, 3G, 4G, 5G, RFID protocols, and the like. By way of a particular example, a user device may be a mobile phone equipped with a Wi-Fi radio that is configured to communicate with a Wi-Fi access point that is in communication with the application access server 200 or other computing devices via a network.

As used herein, the term "first user device" refers to a user device as defined above that is associated with a first user profile and first user which may be in network communication with the application access server, and/or the second user device. For example, a first user device may be smartphone or computing device of a user (e.g., a child associated with the second user device or parent device defined hereinafter) that may request, receive, and/or provide data to or from one of the devices described above. By way of a particular example, a first user device may include a smartphone associated with a child that requests access to an application associated with a financial product (e.g., a credit card or the like).

As used herein, the terms "first user profile" may refer to a collection of settings, configurations, identifiers, data, and information associated with the first user and first user device. A first user profile configured in accordance with the present invention may be accessible by one or more of software applications that are supported by the application access server or computing device (e.g., associated with a financial institution, banking entity, or other 3$^{rd}$ party) and, thus, may include application-specific preferences, settings, configurations, data, and information. In some example embodiments, a first user profile may include one or more financial parameters, transaction histories, balances, spending patterns, social media data entries, location data entries, preferences, or the like of the first user associated with the first user profile.

As used herein, the term "second user device" refers to a user device as defined above that is associated with a second user profile and second user which may be in network communication with the application access server, and/or the first user device. For example, a second user device may be smartphone or computing device of a user (e.g., a parent of the first user) that may request, receive, and/or provide data to or from one of the devices described above. By way of a particular example, a second user device may include a smartphone associated with a parent that requests access to an application associated with a financial product (e.g., a credit card or the like) for the first user, first user profile, and/or first user device.

As used herein, the terms "second user profile" may refer to a collection of settings, configurations, identifiers, data, and information associated with the second user and second user device. A second user profile configured in accordance with the present invention may be accessible by one or more of software applications that are supported by the application access server or other computing device (e.g., associated with a financial institution, banking entity, or other 3$^{rd}$ party) and, thus, may include application-specific preferences, settings, configurations, data, and information. In some example embodiments, a second user profile may include one or more financial parameters, transaction histories, balances, spending patterns, social media data entries, location data entries, preferences, or the like of the second user associated with the second user profile.

As used herein, the term "user parameter database" refers to a data structure or repository for storing user data, user parameters, user profile data and the like. Similarly, the "user parameters" of the user parameter database may refer to data generated by or relevant to a user device and associated user (e.g., account data, transaction data, purchase data, billing data, or the like). The user parameter database may be accessible by one or more software applications of the application access server 200.

As used herein, the terms "evaluation element" may refer to an interactive interface, communication, portal, or the like provided to a user device (e.g., first user device) for review. As described hereafter, an evaluation element of the present disclosure may be generated with testable content associated with an application. In some embodiments, the testable content may refer to a collection of questions that must be answered correctly (e.g., at least a portion of the answers) in order for the system to provide access to the application for the user. By way of example, a first user device may request access to a credit card product or application, and the systems described hereafter may generate an evaluation element having testable content related to credit cards (e.g., a test having questions directed to the successful use of a credit card). Said differently, testable content of the evaluation element as described herein may operate to determine the competency of a user as related to the subject matter of the testable content.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example Apparatus

With reference to FIG. 1, an example system 100 is illustrated with an apparatus (e.g., an application access server 200) communicably connected via a network 104 to a first user device 102 and, in some embodiments, a second user device 106. The example system 100 may also include an user parameter database 110 that may be hosted by the application access server 200 or otherwise hosted by devices in communication with the application access server 200.

The application access server 200 may include circuitry, networked processors, or the like configured to perform some or all of the apparatus-based (e.g., application access server-based) processes described herein, and may be any suitable network server and/or other type of processing device. In this regard, application access server 200 may be embodied by any of a variety of devices. For example, the application access server 200 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, the application access server 200 may be located remotely from the first user device 102, the second user device 106, and/or user parameter database 110, although in other embodiments, the application access server 200 may comprise the first user device 102, the second user device 106, and/or the user parameter database 110. The application access server 200 may, in some embodiments, comprise several servers or computing devices performing interconnected and/or distributed functions. Despite the many arrangements contemplated herein, the application access server 200 is shown and described herein as a single computing device to avoid unnecessarily overcomplicating the disclosure.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

The first user device 102 may refer to a user device associated with a first user as defined above and may be a cellular telephone (e.g., a smartphone and/or other type of mobile telephone), laptop, tablet, electronic reader, e-book device, media device, wearable, smart glasses, smartwatch, or any combination of the above. Similarly, the second user device 106 may refer to a user device associated with a second user as defined above and may also be a cellular telephone (e.g., a smartphone and/or other type of mobile telephone), laptop, tablet, electronic reader, e-book device, media device, wearable, smart glasses, smartwatch, or any combination of the above. Although only a first user device 102 and a second user device 106 are illustrated, the example system 100 may include any number of user devices associated with the same user or any number of respective other users.

The user parameter database 110 may be stored by any suitable storage device configured to store some or all of the information described herein (e.g., memory 204 of the application access server 200 or a separate memory system separate from the application access server 200, such as one or more database systems, backend data servers, network databases, cloud storage devices, or the like provided by another device (e.g., online application or $3^{rd}$ party provider) or the first or second user devices 102, 106). The user parameter database 110 may comprise data received from the application access server 200 (e.g., via a memory 204 and/or processor(s) 202), the first user device 102, or the second user device 106, and the corresponding storage device may thus store this data.

Figure 2:
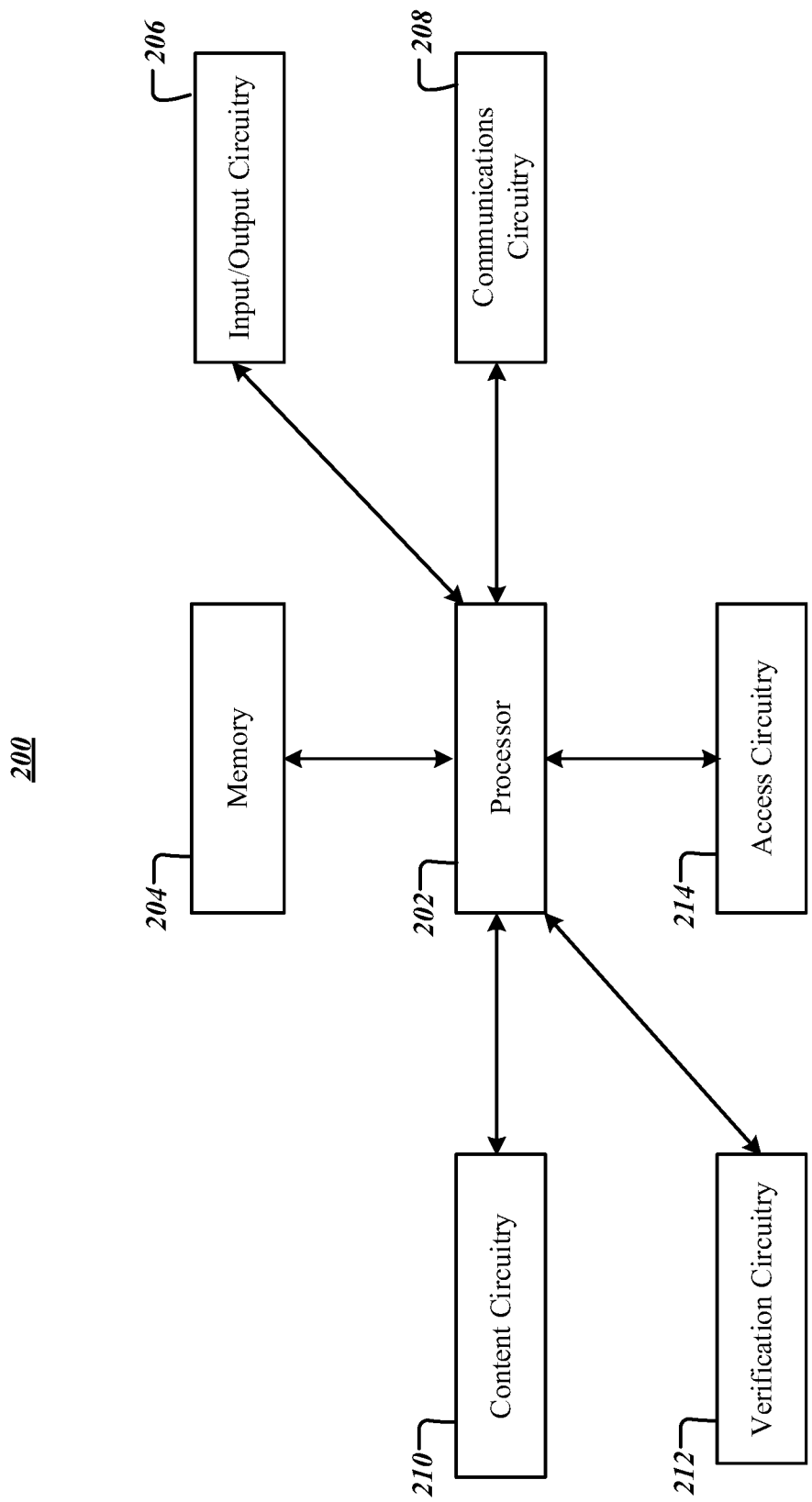
FIG. 2 illustrates a schematic block diagram of example circuitry that may perform various operations, in accordance with some example embodiments described herein.

As illustrated in FIG. 2, the application access server 200 may include a processor 202, a memory 204, communications circuitry 208, and input/output circuitry 206. Moreover, the application access server 200 may include content circuitry 210, verification circuitry 212, and access circuitry 214. The application access server 200 may be configured to execute the operations described below in connection with FIGS. 3-6. Although components 202-214 are described in some cases using functional language, it should be understood that the particular implementations necessarily include the use of particular hardware. It should also be understood that certain of these components 202-214 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the application access server 200 may be housed within the first user device 102 and/or the second user device 106. It will be understood in this regard that some of the components described in connection with the application access server 200 may be housed within one of these devices, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the application access server 200 may provide or supplement the functionality of particular circuitry.

In some embodiments, the processor 202 (and/or coprocessor or any other processing circuitry assisting or otherwise associated with the processor) may be in communication with the memory 204 via a bus for passing information among components of the application access server 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the application access server 200 to carry out various functions in accordance with example embodiments of the present invention.

The processor 202 may be embodied in a number of different ways and may, for example, include one or more processing devices configured to perform independently. Additionally, or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the application access server, and/or remote or "cloud" processors.

In an example embodiment, the processor 202 may be configured to execute instructions stored in the memory 204 or otherwise accessible to the processor 202. Alternatively, or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

The application access server 200 further includes input/output circuitry 206 that may, in turn, be in communication with processor 202 to provide output to a user and to receive input from a user, user device, or another source. In this regard, the input/output circuitry 206 may comprise a display that may be manipulated by a mobile application. In some embodiments, the input/output circuitry 206 may also include additional functionality such as a keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the application access server 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). These signals may be transmitted by the application access server 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

The content circuitry 210 includes hardware components designed to determine an application associated with an access request and generate an evaluation element with testable content associated with the application. The content circuitry 210 may utilize processing circuitry, such as the processor 202, to perform its corresponding operations, and may utilize memory 204 to store collected information. In some instances, the content circuitry 210 may query the user parameter database 110 to receive one or more user parameters. The content circuitry 210 may modify the testable content based on the user parameters.

The verification circuitry 212 includes hardware components designed to determine completion of evaluation elements. The verification circuitry 212 may be configured to receive responsive evaluation elements from a user device (e.g., first user device) and may determine completion or failure of the evaluation element based upon a comparison between the responsive evaluation element and one or more competency thresholds. The verification circuitry 212 may utilize processing circuitry, such as the processor 202, to perform its corresponding operations, and may utilize memory 204 to store collected information.

The access circuitry 214 includes hardware components designed provide access to an application for a user device. The access circuitry 210 may utilize processing circuitry, such as the processor 202, to perform its corresponding operations, and may utilize memory 204 to store collected information. In some instances, the access circuitry 210 prevent access of a user device to an application or halt prior access to an application.

It should also be appreciated that, in some embodiments, the content circuitry 210, verification circuitry 212, or access circuitry 214, may include a separate processor, specially configured field programmable gate array (FPGA), or application specific interface circuit (ASIC) to perform its corresponding functions.

In addition, computer program instructions and/or other type of code may be loaded onto a computer, processor or other programmable application access server's circuitry to produce a machine, such that the computer, processor other programmable circuitry that execute the code on the machine create the means for implementing the various functions, including those described in connection with the components of application access server 200.

As described above and as will be appreciated based on this disclosure, embodiments of the present invention may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Verified Application Access

Figure 3:
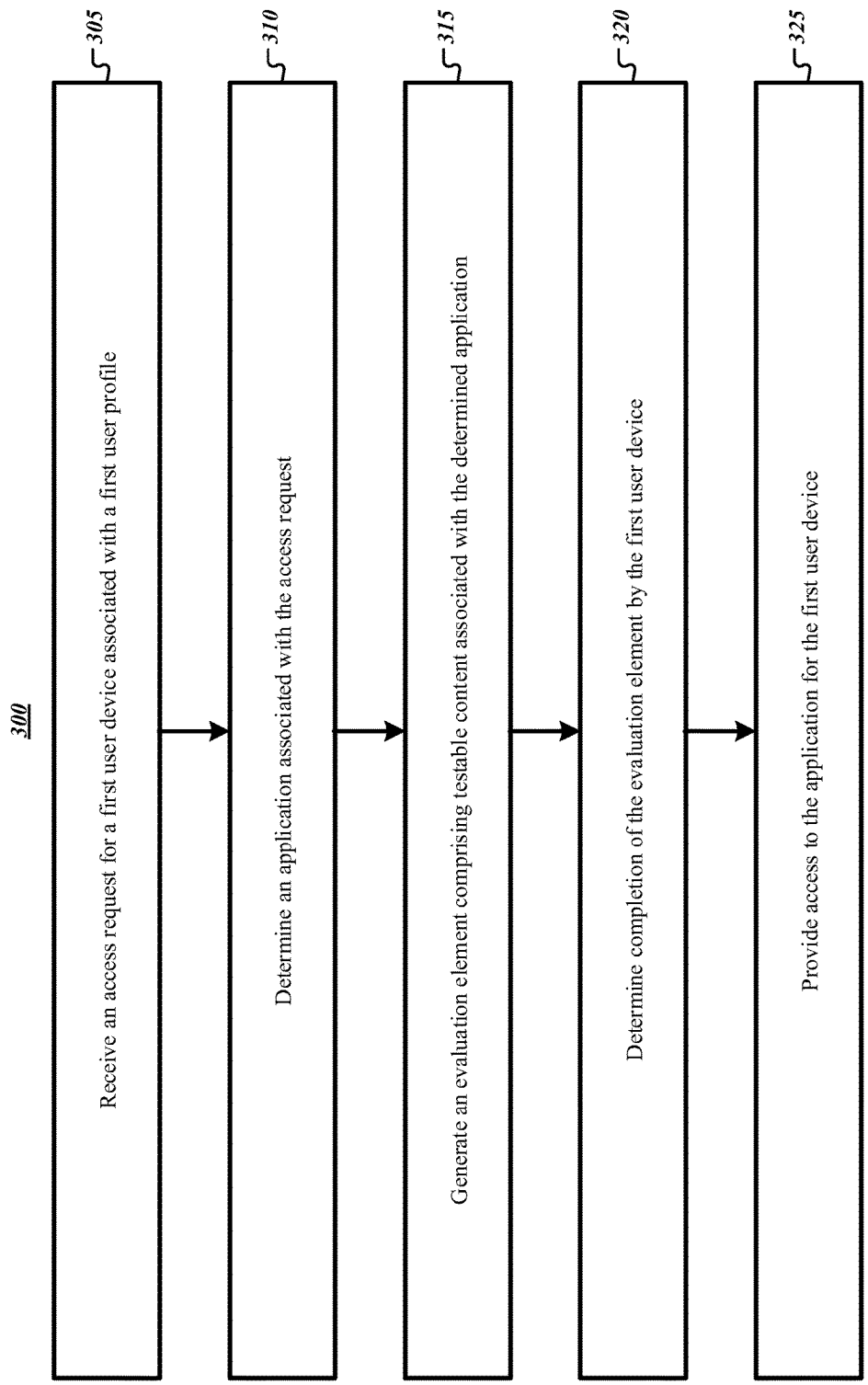
FIG. 3 illustrates an example flowchart for providing verified application access, in accordance with some example embodiments described herein.

FIG. 3 illustrates a flowchart containing a series of operations for providing verified application access. The operations illustrated in FIG. 3 may, for example, be performed by, with the assistance of, and/or under the control of an apparatus (e.g., application access server 200), as described above. In this regard, performance of the operations may invoke one or more of processor 202, memory 204, input/output circuitry 206, communications circuitry 208, content circuitry 210, verification circuitry 212, and/or access circuitry 214.

As shown in operation 305, the apparatus (e.g., application access server 200) includes means, such as input/output circuitry 206, communications circuitry 208, or the like, for receiving an access request for a first user device 102 associated with a first user profile. In some example embodiments, the communications circuitry 208 may receive an access request for the first user device 102 from the first user device 102. By way of example, a first user (e.g., child user) associated with the first user device 102 and first user profile may request access to an application by transmitting a request to the application access server 200 requesting such access. The request may, in some instances, explicitly indicate the application to which the first user requests access. In other embodiments, the request received at operation 305 may be transmitted in response to an attempt to access a particular application. By way of example, a first user (e.g., child user) associated with the first user device 102 may attempt to open a credit card interface, portal, or other access point and a request for access may be generated in response to this attempt. Although described herein with reference to an example credit card application, the present disclosure contemplates that the embodiments described herein may be similarly applicable to any financial product or other application to which access may be limited or otherwise restricted. Additionally, although described herein as an access request associated with a first user device 102, the present disclosure contemplates that the access request may refer to access to be provided to a first user (e.g., first user account or the like) separate from the first user device 106. By way of example, the access request received at operation 305 may refer to a request for access to a credit card of the first user (e.g., enabling operation of the credit card) with or without the first user device 106.

In some example embodiments, the communications circuitry 208 may receive an access request for the first user device 102 from the second user device 106. By way of example, a second user (e.g., parent user) associated with the second user device 106 and second user profile may request access to an application for the first user and first user device 102 by transmitting a request to the application access server 200 requesting such access. The second user device 106 may, in some embodiments, be configured to control the access, permissions, etc. of the first user device with respect to at least the applications supported by the apparatus 200 (e.g., the second user device 106 may also control other features of the first user device 102). For example, the accounts of the first user and first user device 102 (e.g., with a financial institution or otherwise) may be attached with or tethered to accounts of the second user and second user device 106. As such, the second user device 106 may transmit a request to the apparatus 200 that includes a request for application access for the first user device 102. Although described herein with reference to an application, the present disclosure contemplates that the access request may also refer to a request to access a financial product, interface, portal, account, or the like.

Thereafter, as shown in operation 310, the apparatus (e.g., application access server 200) includes means, such as input/output circuitry 206, content circuitry 210, content circuitry 212, or the like, for determining an application associated with the access request. As described above, in some instances, the access request received at operation 305 may explicitly refer to the application to which access is requested. Said differently, the determination at operation 310 may include analysis of the request receive at operation 305 and subsequent selection of the application provided in the access request. In other embodiments, the access request received at operation 305 may be generated in response to first user's attempt to access a particular application. In such an embodiment, the determination of the application associated with the access request at operation 310 may include analysis of attempted access and determination of the application as the application to which access was attempted.

In some embodiments, the application associated with the access request may not be provided as part of the access request. By way of example, the access request may be received from the second user device 106 as described above and may only list goals or content that is not tied to a particular application. By way of a particular example, a second user (e.g., parent user) associated with the second user device 106 may transmit a request for access received at operation 305 that indicates that the second user desires for the first user to become more adept at saving money. In response, the content circuitry 210 may analyze the second user profile to determine potential applications associated with saving money. For example, the second user profile may indicate, via transaction history, current balances, etc., that the second user wants to provide access for the first user device 102 to a savings account application. Although described herein with reference to a savings account application determined from analysis of the second user profile, the present disclosure contemplates that any data relating to the first user, first user device 102, first user profile, second user, second user device 106, and/or second user profile may be used to determine the application associated with the access request.

Thereafter, as shown in operation 315, the apparatus (e.g., application access server 200) includes means, such as processor 202, content circuitry 210, or the like, for generating an evaluation element comprising testable content associated with the determined application. As described hereafter with reference to FIG. 4, the content circuitry 210 may generate an evaluation element that refers to an interactive interface, communication portal, or the like that may, in some embodiments, receive inputs (e.g., answers) from a first user device 102. The evaluation element generated at operation 315 may include testable content associated with the application determined at operation 310. As described above, the testable content may include a collection of questions that must be answered correctly (e.g., at least a portion of the questions answered corrected) in order for the system to provide access to the application for the user. By way of continued example, the application determined at operation 310 may include a credit card application such that the content circuitry 210 at operation 315 may generate an evaluation element with testable content relating to successful use of a credit card. Although described herein with reference to a single generation of an evaluation element, the present disclosure contemplates that evaluation elements may be generated, for example, in response to each subsequent access request (e.g., each attempt to access a credit card application by the first user device 102).

In some embodiments, the content circuitry 210 may access a repository of potential testable content, stored in memory 204 or otherwise, and select one or more testable content elements for use as part of the evaluation element. By way of example, the application access server 200 may include a plurality of testable content (e.g., facts, questions, video clips, images, or the like) related to one or more of the applications hosted by or accessed through the server 200. This testable content may be added to, revised, or updated periodically in order to provide variability for the evaluation elements generated at operation 315. With continued reference to a credit card application example, the content circuitry 210 may retrieve testable content in the form of questions related to operation of a credit card (e.g., "What is an interest rate?") and may generate an evaluation element in the form of a questionnaire, interactive interface, etc. for completion by the first user. The present disclosure contemplates that any number of testable content may be included in the evaluation element at operation 315 so long as the testable content is associated with the application determined at operation 310. Furthermore, although described with reference to a questionnaire or interactive interface, the present disclosure contemplates that the evaluation element may be in any form (e.g., any element for receiving user inputs indicative of the answer or competency of the first user). The testable content may be modified by user data (e.g., the first user profile) as described hereafter with reference to FIG. 4.

Thereafter, as shown in operation 320, the apparatus (e.g., application access server 200) includes means, such as the processor 202, the verification circuitry 212, or the like, for determining completion of the evaluation element by the first user device 102. As described hereafter with reference to FIG. 5, in some embodiments, the evaluation element may be provided by the application access server 200 to the first user device 102. Said differently, the application access server may provide the evaluation element including testable content to the first user device 102 for interaction with the first user. As described above, the testable content of the evaluation element may include a collection of questions, videos, images, or the like that are reviewable and/or answerable by the user. Said differently, the evaluation element may operate as a test of the first user's competency with regard to the subject matter of the application to which access is requested.

Figure 5:
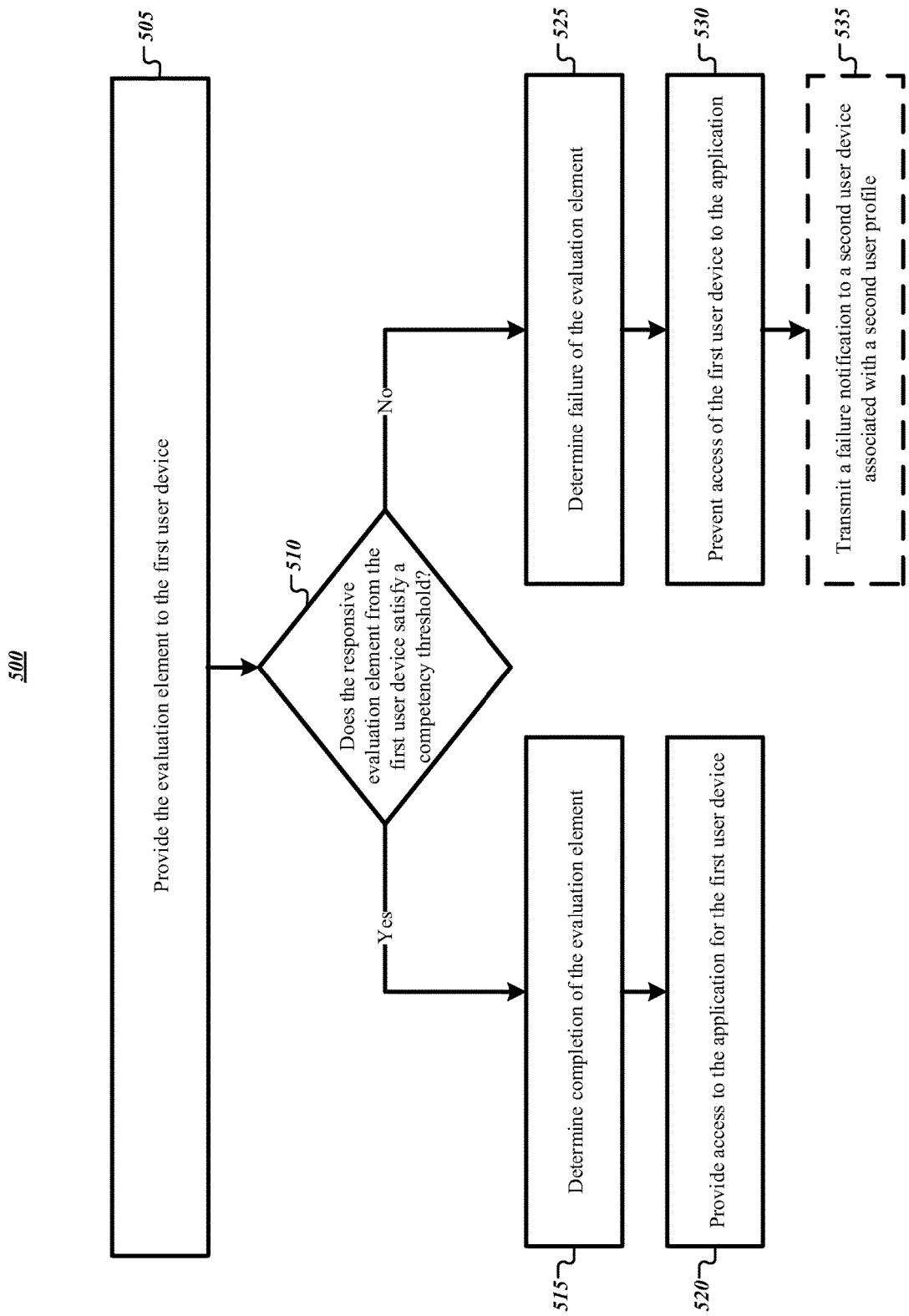
FIG. 5 illustrates an example flowchart for evaluation element completion determinations, in accordance with some example embodiments described herein.

By way of example and as described hereafter with reference to FIG. 5, the evaluation element comprising testable content may, in some instances, includes a plurality of questions for review and answer by the first user via the first user device 102. The first user may review and answer these questions via the first user device 102 and the results of this review may be provided to the application access server 200 in the form of a responsive evaluation element (e.g., a response to the evaluation element). The evaluation element generated at operation 315 may, for example, include ten (10) distinct testable content elements (e.g., ten (10) questions for review by the first user on the first user device 102) relating to a credit card application associated with the access request received at operation 305. The application access server 200 may receive a responsive evaluation element from the first user device 102 with nine (9) of the ten (10) testable content element completed correctly (e.g., 90% of the evaluation element is accurate). As described hereafter, the verification circuitry 212 may utilize a competency threshold to which the responsive evaluation element is compared to determine if the evaluation is complete.

By way of continued example, in an instance in which the competency threshold is 50% or more, the verification circuitry may determine completion of the evaluation element by the first user device 102 at operation 320. Although described herein with reference to questions for completion by the first user via the first user device 102, the present disclosure contemplates that any mechanism (e.g., multiple choice questions, true false questions, videos, images, soundbites, etc.) may be used by the embodiments herein to determine the competency of the first user with respect to the application associated with the access request. In some embodiments, the competency threshold may be determined by the second user, second user profile, and/or second user device 106. For example, the second user (e.g., parent user) associated with the first user (e.g., child user) may set the competency threshold as part of an initial set up procedure, in response to a request for access by the first user and first user device 102, or the like.

Thereafter, as shown in operation 320, the apparatus (e.g., application access server 200) includes means, such as the processor 202, the access circuitry 214, or the like, for providing access to the application for the first user device. As described above with reference to operation 315, the verification circuitry 212 may determine completion of the evaluation element indicative of sufficient competency regarding the application (e.g., the subject matter of the financial product or the like) and may provide access to the first user device 102 to this application. In some embodiments, such as with reference to a credit card application, the access provided at operation 325 may refer to immediate availability of at least some functionality associated with a credit card. Said differently, in some instances, the first user, first user device 102, second user, and/or second user device 106 may have previously (e.g., as part of an initial set up procedure) completed necessary documentation for the first user and first user device 102 to access an application associated with a credit card. In such an embodiment, the functionality of the credit card application may be available to the first user by a financial institution but restricted by the application access server 200 described herein. As such, the access provided at operation 320 may refer to removing one or more restrictions to allow at least partial functionality to the first user and first user device 102. As described above, this access provided at operation 325 may be separate from the first user device 102 such as enabling operation of the credit card with or without use of the first user device 102.

In other embodiments, with continued reference to a credit card application, the access provided at operation 325 may refer to staging of documents to complete a request for access to a credit card application. Said differently, in some instances, the access request received at operation 305 may refer to a preliminary or initial request for access to a, for example, credit card application. In such an embodiment, the functionality of the credit card application may be unavailable to the first user and require completion of necessary documentation by the first user and approval by an associated financial institution. As such, the access provided at operation 320 may refer to completing documentation requesting access to the credit card application or providing staged (e.g., previously completed but unsubmitted) documents to a financial institution or business providing the credit card application functionality. In some embodiments, the application access server 200 may transmit a notification of the access provided at operation 320 to the second user (e.g., parent user) via the second device 106. In such an example embodiment, the notification transmitted to the second user device 106 may include options to approve access of the first user device 102 to the application so as to allow further approval of the second user (e.g., parent user) of the actions by the first user (e.g., child user).

Figure 4:
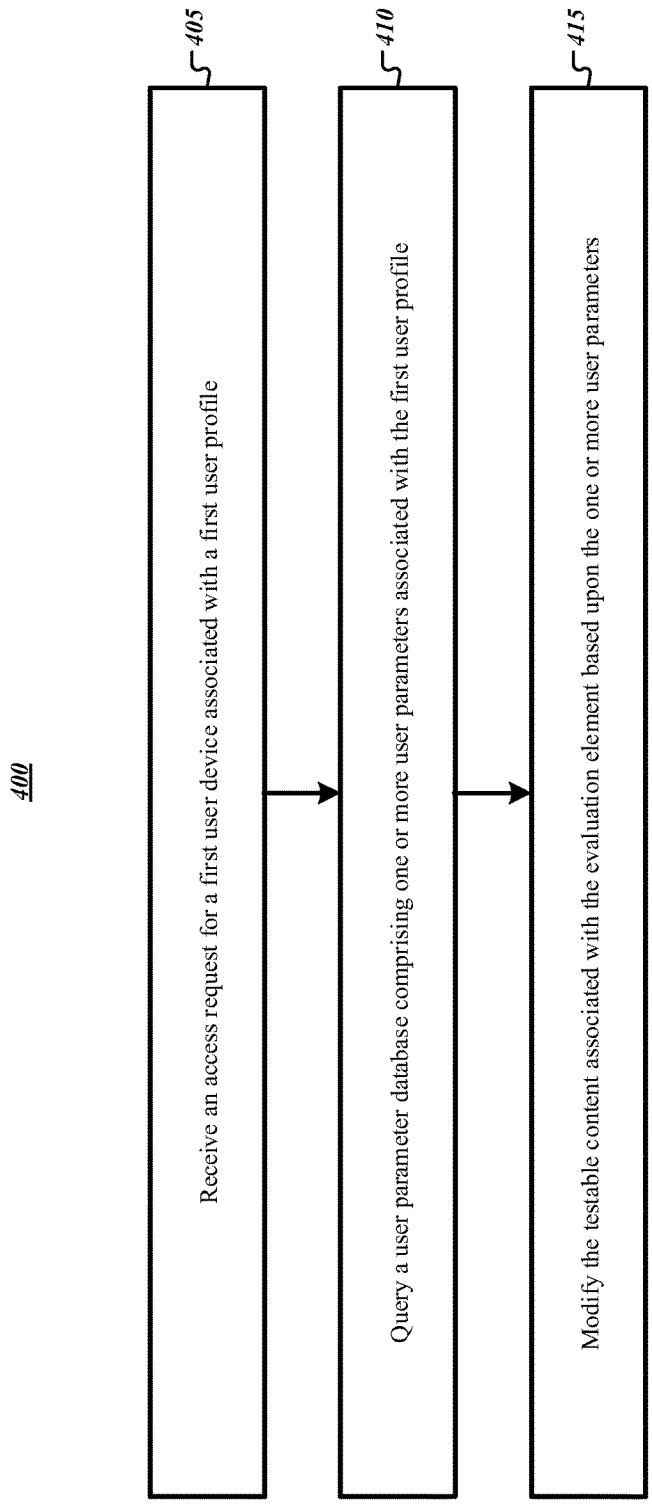
FIG. 4 illustrates an example flowchart for testable content modifications, in accordance with some example embodiments described herein.

Turning next to FIG. 4, a flowchart is shown for testable content modifications. The operations illustrated in FIG. 4 may, for example, be performed by, with the assistance of, and/or under the control of an apparatus (e.g., application access server 200), as described above. In this regard, performance of the operations may invoke one or more of processor 202, memory 204, input/output circuitry 206, communications circuitry 208, content circuitry 210, verification circuitry 212, and/or access circuitry 214.

As shown in operation 405, the apparatus (e.g., application access server 200) includes means, such as input/output circuitry 206, communications circuitry 208, or the like, for receiving an access request for a first user device associated with a first user profile. As described above with reference to FIG. 3, the communications circuitry 208 of the application access server 200 may receive an access request from the first user device 102, the second user device 106, and or in response by an attempted access of an application by the first user device 102. The application associated with the access request, described above with reference to operation 310, may be used to generate the evaluation element with testable content associated with the application. In some embodiments, however, information relating to the first user (e.g., first user device 102) may further be used to improve the testable content presented to the first user via the evaluation element.

With continued reference to FIG. 4, as shown in operation 410, the apparatus (e.g., application access server 200) includes means, such as processor 202, content circuitry 210, or the like, for querying a user parameter database 110 storing one or more user parameters of the first user profile. As described above, the user parameter database 110 refers to a data structure or repository for storing user data, user parameters, user profile data and the like. The user parameters of the first user profile and associated first user device 102 refer to data generated by or relevant to the first user device including account data, transaction data, purchase data, billing data, social media data, location data etc. or the like). By way of example, the content circuitry 210 may query the user parameter database 110 to retrieve financial transaction data (for example debit card transactions) of the first user and first user device 102.

As shown in operation 415, the apparatus (e.g., application access server 200) includes means, such as input/output circuitry 206, content circuitry 210, or the like, for modifying the testable content associated with the evaluation element based upon the one or more user parameters. As described herein, the evaluation element may include a plurality of testable content configured to determine the competency of the first user with respect to the application for which access is requested. As such the evaluation element described with reference to operation 315 may include testable content associated with the subject matter of the application. The user parameters associated with the first user and first user device, however, may be further used by the content circuitry 210 to dynamically modify the evaluation element to more accurately reflect the first user. In this way, the embodiment of the present application may be personalized for particular users while also improving competency determinations.

By way of continued example, the content circuitry 210 may determine that the application associated with the access request concerns a credit card application. The content circuitry may generate an evaluation element that includes testable content relating to credit card applications (e.g., questions relating to the successful use of credit cards). At operations 410 and 415, however, the content circuitry may receive user parameters associated with the first user profile indicating, for example, large, frequent transactions with the user's debit card. As such, the content circuitry 210 may modify the testable content provided to the user based upon these user parameters to include questions and information relating to maintaining a lower credit card balance and required minimum payments. By way of an additional example, the user parameters may, in some instances, include transactions indicative of responsible spending such as regular deposits into an investment and/or savings account. In response, the content circuitry 210 may modify the testable content of the evaluation element to reduce or remove testable content relating to savings accounts or goals. As the user parameters associated with the user profile are iteratively updated, further modification (such as in subsequent generations of an evaluation element) may be employed to dynamically adjust the information and questions (e.g., testable content) provided to the first user and first user device 102.

Turning next to FIG. 5, a flowchart is shown for evaluation element completion determinations. The operations illustrated in FIG. 5 may, for example, be performed by, with the assistance of, and/or under the control of an apparatus (e.g., application access server 200), as described above. In this regard, performance of the operations may invoke one or more of processor 202, memory 204, input/output circuitry 206, communications circuitry 208, content circuitry 210, verification circuitry 212, and/or access circuitry 214.

As shown in operation 505, the apparatus (e.g., application access server 200) includes means, such as input/output circuitry 206, communications circuitry 208, or the like, for providing the evaluation element to the first user device 102. As described above, the application access server 200 may be communicably coupled with the first user device 102 via the network 104. As such, the application access server 200 may, in some embodiments, transmit the evaluation element to the first user device 102. In embodiments in which the first user device 102 comprises some or all of the apparatus 200, the first user device 102 may display the evaluation element to the user of the first user device 102. As described above, the evaluation element comprising testable content may, in some instances, include a plurality of questions for review and answer by the first user via the first user device 102. The first user may review and answer these questions via the first user device 102 and the results of this review may be provided to the application access server 200 in the form of a responsive evaluation element (e.g., a response to the evaluation element).

Thereafter, as shown in operation 510, the apparatus (e.g., application access server 200) includes means, such as the processor 202, the verification circuitry 212, or the like, or the like, for determining if the responsive evaluation element from the first user device 102 satisfies a competency threshold. By way of example, the evaluation element generated and provided to the first user device at operation 505 may, for example, include ten (10) distinct testable content elements (e.g., ten (10) questions for review by the first user on the first user device 102) relating to a credit card application (e.g., associated with the access request). The application access server 200 may receive a responsive evaluation element from the first user device 102 with nine (9) of the ten (10) testable content element completed correctly (e.g., 90% of the evaluation element is accurate).

By way of continued example, the verification circuitry 212 may utilize a competency threshold to which the responsive evaluation element is compared to determine if the evaluation is complete. In an instance in which the competency threshold is, for example, 50% or more, the verification circuitry 212 may determine completion of the evaluation element by the first user device 102 at operation 515. Although described herein with reference to questions for completion by the first user via the first user device 102, the present disclosure contemplates that any mechanism (e.g., multiple choice questions, true false questions, videos, images, soundbites, etc.) may be used by the embodiments herein to determine the competency of the first user with respect to the application associated with the access request. Furthermore, the present disclosure contemplates that the competency threshold may be adjusted based upon the user parameters of the first user and first user device 102, based upon the subject matter of the application to which access is requested, or the like.

Thereafter, as shown in operation 520, the apparatus (e.g., application access server 200) includes means, such as the processor 202, the access circuitry 214, or the like, for providing access to the application for the first user device 102. As described above with reference to operation 325, the access provided at operation 520 may refer to immediate availability of at least some functionality associated with a credit card or may refer to complete or partial staging of documentation to procure access to the application.

If the responsive evaluation element from the first user device 102 fails to satisfy the competency threshold, the apparatus (e.g., application access server 200) may include means, such as the processor 202, the access circuitry 214, or the like, for determining failure of the evaluation element as shown in operation 525. By way of example, the evaluation element generated and provided to the first user device at operation 505 may, for example, include ten (10) distinct testable content elements (e.g., ten (10) questions for review by the first user on the first user device 102) relating to a credit card application (e.g., associated with the access request). The application access server 200 may receive a responsive evaluation element from the first user device 102 with three (3) of the ten (10) testable content element completed correctly (e.g., 30% of the evaluation element is accurate). The verification circuitry 212 may utilize a competency threshold to which the responsive evaluation element is compared to determine if the evaluation is complete. In an instance in which the competency threshold is, for example, 50% or more, the verification circuitry 212 may determine failure of the evaluation element by the first user device 102 at operation 525.

Thereafter, as shown in operations 530 and 535, the apparatus (e.g., application access server 200) includes means, such as the processor 202, the communications circuitry 208, the access circuitry 214, or the like, for preventing access to the application for the first user device 102 and, in some embodiments, transmitting a failure notification to a second user device 106 associated with a second user profile. By way of example, the responsive evaluation element received from the first user device 102 may fail to satisfy the competency threshold as described above indicating a lack of sufficient knowledge with regard to the subject matter associated with the application to which access is requested. Due to the insufficient competency of the first user and first user device 102, the access circuitry 214 may prevent the first user device 102 from accessing the application. Additionally, in some embodiments, a subsequent failure notification may be provided to the second user (e.g., parent user) and second user device 106. In this way, the application access circuitry 200 may prevent unverified access to applications while also notifying related devices (e.g., the parent user) of failed attempts to access the requested application. In some embodiments, the notification to the second user and second user device 106 may indicate the testable content of the evaluation element completed correctly and incorrectly by the first user and first user device 102.

Figure 6:
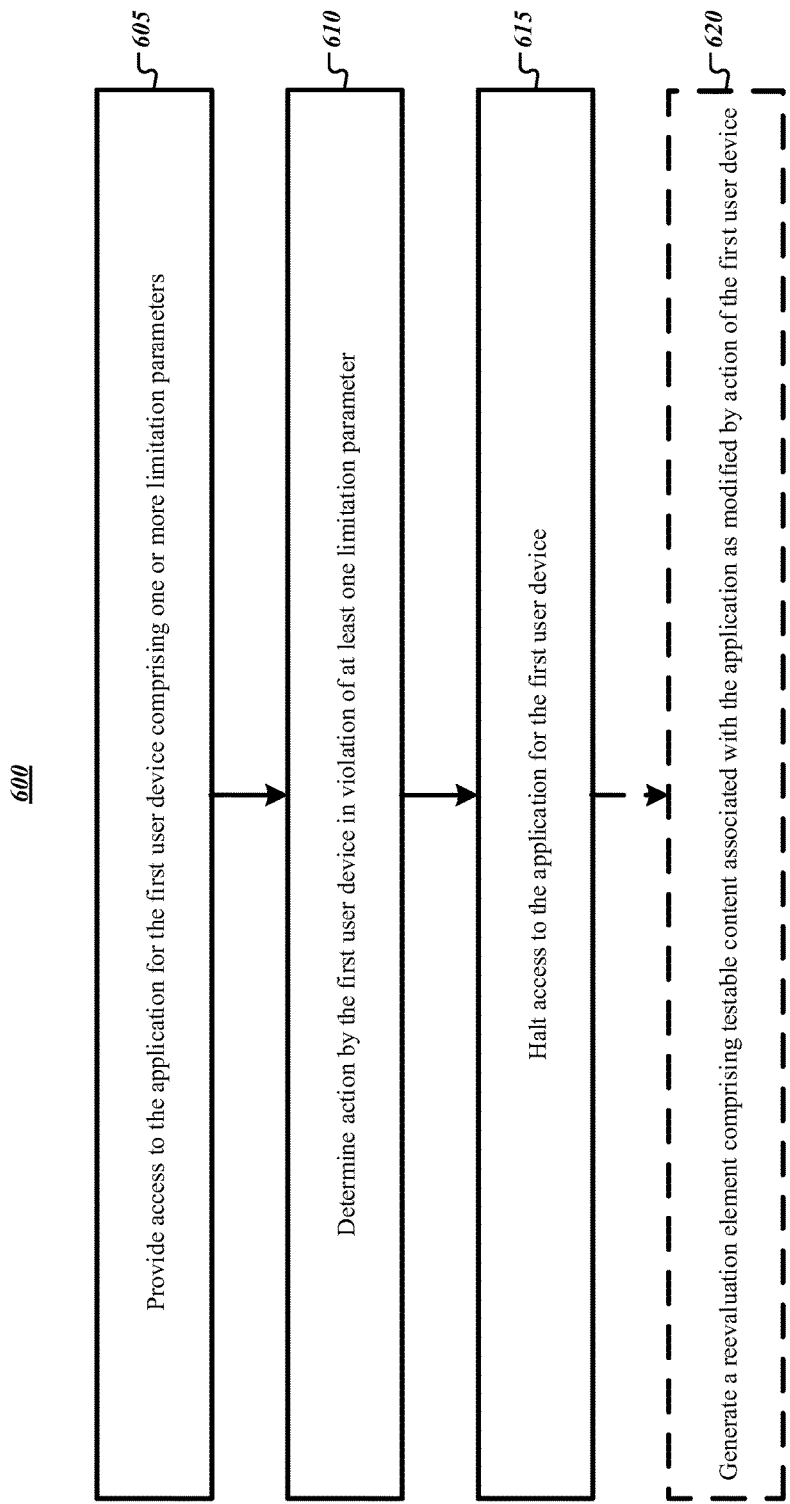
FIG. 6 illustrates an example flowchart for limitation parameter operations, in accordance with some example embodiments described herein.

Turning next to FIG. 6, a flowchart is shown for limitation parameter operations. The operations illustrated in FIG. 6 may, for example, be performed by, with the assistance of, and/or under the control of an apparatus (e.g., application access server 200), as described above. In this regard, performance of the operations may invoke one or more of processor 202, memory 204, input/output circuitry 206, communications circuitry 208, content circuitry 210, verification circuitry 212, and/or access circuitry 214.

As shown in operation 605, the apparatus (e.g., application access server 200) includes means, such as input/output circuitry 206, communications circuitry 208, or the like, for providing the evaluation element to the first user device 102 with one or more limitation parameters. As described above with reference to operation 325, the access provided at operation 520 may refer to immediate availability of at least some functionality associated with a credit card or may refer to complete or partial staging of documentation to procure access to the application. As shown in operation 605, in some embodiments, the access provided to the first user device 102 may include one or more limitation parameters configured to regulate access of the first user device 102. By way of example, the one or more limitation parameters may define spending limits, minimum payment amounts, time limitations, or the like related to the access of the first user device 102. The one or more limitation parameters may, in some embodiments, be set by the application access server 200 based upon the user parameters of the first user profile. Said differently, the content circuitry 210 may analyze the spending patterns, balances, etc. of the first user profile and determine access limitations for the first user device 102 with respect to the application. In other embodiments, the one or more limitations may be set by the second user, second user profile, and/or second user device 106. By way of example, a parent user (e.g., second user) may determine various spending limitations, payment timing requirements, or the like that regulate the access of the first user device 102 to the application.

Thereafter, as shown in operation 610, the apparatus (e.g., application access server 200) includes means, such as the processor 202, the verification circuitry 212, or the like, or the like, for determining action by the first user device 102 in violation of at least one limitation parameter. By way of example, the one or more limitation parameters may define a maximum outstanding balance for a credit card application (e.g., an outstanding balance of $1,000). The verification circuitry 212 may monitor the first user device's 102 access to the application and may determine actions that violate at least one limitation.

By way of continued example, the verification circuitry 212 may monitor transactions with the credit card application by the first user device 102 and identify an attempt by the first user device to complete a transaction that would exceed a maximum outstanding balance limitation associated with the first user device's access to the application (e.g., a transaction that exceeds $1,000). The verification circuitry 212 may determine that such action violates the limitation parameter at operation 610. In response, the apparatus (e.g., application access server 200) includes means, such as the processor 202, the verification circuitry 212, or the like, or the like, for halting access to the application for the first user device 102 as shown in operation 615. In some embodiments, halting access may refer to including one or more restrictions on the functionality of the credit card application based upon the limitation violated by the first user device 102. In other embodiments, halting access may refer to cancelation of the credit card application such that further requests for access require reverification of the first user and first user device 102. Although described herein with reference to reduced or removed functionality of the application, the present disclosure contemplates that halting access to the application for the first user device 102 may include any change in operation based upon the nature of the action by the first user device 102 and/or the limitation parameters.

In some embodiments, as shown in operation 620, the apparatus (e.g., application access server 200) includes means, such as the processor 202, the verification circuitry 212, or the like, or the like, for generating a reevaluation element comprising testable content associated with the application as modified by action of the first user device 102. By way of continued example, the evaluation element generated by the content circuitry 210 may comprise testable content associated with the application to which access is requested. By failing to comply with the limitation parameters associated with access to the application; however, the first user may require reverification by completion of a reevaluation element. The generation of such reevaluation element may include the generation of testable content that is associated with the application but that is further modified by the action (e.g., that action that violated the limitation parameter) of the user device. For example, an action by the first user device that attempts to exceed a maximum outstanding balance limitation may modify the testable content of the reevaluation element to include subject matter relating to maximum outstanding balances. Although described herein with reference to maximum balances, the present disclosure contemplates that the testable content of the reevaluation element may be directed to any feature, content, subject matter, or the like based upon the limitation parameters and/or actions by the first user and first user device 102.

As described above, various technical challenges are surmounted via technical solutions contemplated herein. For instance, example implementations of embodiments of the present invention utilize evaluation elements that include testable content relating to requested application access to ensure verified application access. In operation, embodiments of the present disclosure may receive an access request for a first user device associated with an application to be accessed. The system may generate an evaluation element that includes testable content associated with the application and determine completion of the evaluation element by the first user device before providing access to the application. Additionally, example embodiments may further leverage user parameters to modify, augment, or otherwise inform the generation of the evaluation element so as to dynamically customize testable content to a particular user profile and application request. Furthermore, during access embodiments of the present disclosure may monitor user action to ensure compliance with various limitation parameters associated with the access (e.g., spending limits, timing limits, etc.) and may generate a reevaluation element in instances in which a user action fails to comply with these limitations. In this way, the inventors have identified that the advent of new account technologies have created a new opportunity for solutions for verifying application access which were historically unavailable. In doing so, such example implementations confront and solve at least two technical challenges: (1) they reliably verify access requests prior and during application access, and (2) they enable and improve device interoperability in the context of account controls.

FIGS. 3-6 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the application access server 200 and executed by a processor 202 of the application access server 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for providing verified application access, the method comprising:
   receiving, via a computing device, an access request for a first user device associated with a first user profile;
   determining, via content circuitry of the computing device, a financial application associated with the access request;
   identifying, via the content circuitry of the computing device, one or more terms and conditions governing usage of the financial application;
   generating, via the content circuitry of the computing device, an evaluation element comprising testable content associated with a competency of a user to utilize the financial application, wherein the competency of the user to utilize the financial application includes demonstration of an understanding of one or more of the terms and conditions governing usage of the financial application, and wherein the testable content is customized based on the first user profile;
   determining, via verification circuitry of the computing device, completion of the evaluation element by the first user device, wherein completion of the evaluation element indicates the competency of the user to utilize the financial application; and
   providing, via access circuitry of the computing device, access to the financial application for the first user device in response to completion of the evaluation element, wherein access to the financial application is provided with one or more limitation parameters and a reevaluation element is generated in response to an action in violation of the one or more limitation parameters.

2. The method according to claim 1, wherein generating the evaluation element further comprises:
   querying, via the content circuitry, a user parameter database comprising one or more user parameters associated with the first user profile; and
   modifying, via the content circuitry, the testable content associated with the evaluation element based upon the one or more user parameters.

3. The method according to claim 1, wherein determining completion of the evaluation element further comprises:
   providing, via the verification circuitry, the evaluation element to the first user device;
   determining, via the verification circuitry, completion of the evaluation element in an instance in which the computing device receives a responsive evaluation element from the first user device that satisfies a competency threshold; and
   determining, via the verification circuitry, failure of the evaluation element in an instance in which the computing device receives a responsive evaluation element from the first user device that fails to satisfy the competency threshold.

4. The method according to claim 3, further comprising preventing, via the access circuitry, access of the first user device to the financial application in response to determining failure of the evaluation element.

5. The method according to claim 4, further comprising transmitting, via the computing device, a failure notification to a second user device associated with a second user profile.

6. The method according to claim 1, further comprising:
   determining, via the verification circuitry, action by the first user device in violation of at least one of the one or more limitation parameters; and
   halting, via access circuitry of the computing device, access to the financial application for the first user device.

7. The method according to claim 6, further comprising generating, via the content circuitry, the reevaluation element comprising testable content corresponding to the action by the first user device in violation of the at least one of the one or more limitation parameters.

8. An apparatus for providing verified application access, the apparatus comprising:
   communications circuitry configured to receive an access request for a first user device associated with a first user profile;
   content circuitry configured to:
      determine a financial application associated with the access request; and
      identify one or more terms and conditions governing usage of the financial application;
      generate an evaluation element comprising testable content associated with a competency of a user to utilize the financial application, wherein the competency of the user to utilize the financial application includes demonstration of an understanding of one or more of the terms and conditions governing usage of the financial application, and wherein the testable content is customized based on the first user profile;
   verification circuitry configured to determine completion of the evaluation element by the first user device, wherein completion of the evaluation element indicates the competency of the user to utilize the financial application; and access circuitry configured to provide access to the financial application for the first user device in response to completion of the evaluation element, wherein access to the financial application is provided with one or more limitation parameters and a reevaluation element is generated in response to an action in violation of the one or more limitation parameters.

9. The apparatus according to claim 8, wherein the content circuitry is further configured to:
   query a user parameter database comprising one or more user parameters associated with the first user profile; and
   modify the testable content associated with the evaluation element based upon the one or more user parameters.

10. The apparatus according to claim 8, wherein the verification circuitry is further configured to:
   provide the evaluation element to the first user device;
   determine completion of the evaluation element in an instance in which the communications circuitry receives a responsive evaluation element from the first user device that satisfies a competency threshold; and
   determine failure of the evaluation element in an instance in which the communications circuitry receives a responsive evaluation element from the first user device that fails to satisfy the competency threshold.

11. The apparatus according to claim 10, wherein the access circuitry is further configured to prevent access of the first user device to the financial application in response to determining failure of the evaluation element.

12. The apparatus according to claim 11, wherein the communications circuitry is further configured to transmit a failure notification to a second user device associated with a second user profile.

13. The apparatus according to claim 8, wherein the verification circuitry is further configured to determine action by the first user device in violation of at least one of the one or more limitation parameters and the access circuitry is further configured to halt access to the financial application for the first user device.

14. The apparatus according to claim 13, wherein the communications circuitry is further configured to generate the reevaluation element comprising testable content corresponding to the action by the first user device in violation of the at least one of the one or more limitation parameters.

15. A non-transitory computer-readable storage medium for providing verified application access, the non-transitory computer-readable storage medium storing instructions that, when executed by a processor, cause the processor to:
   receive an access request for a first user device associated with a first user profile;
   determine a financial application associated with the access request;
   identify one or more terms and conditions governing usage of the financial application
   generate an evaluation element comprising testable content associated with a competency of a user to utilize the financial application, wherein the competency of the user to utilize the financial application includes demonstration of an understanding of one or more of the terms and conditions governing usage of the financial application, and wherein the testable content is customized based on the first user profile;
   determine completion of the evaluation element by the first user device, wherein completion of the evaluation element indicates the competency of the user to utilize the financial application; and provide access to the financial application for the first user device in response to completion of the evaluation element, wherein access to the financial application is provided with one or more limitation parameters and a reevaluation element is generated in response to an action in violation of the one or more limitation parameters.

16. The non-transitory computer-readable storage medium according to claim 15 storing instruction that, when executed, cause the processor to:
   query a user parameter database comprising one or more user parameters associated with the first user profile; and
   modify the testable content associated with the evaluation element based upon the one or more user parameters.

17. The non-transitory computer-readable storage medium according to claim 15 storing instruction that, when executed, cause the processor to:
   determine action by the first user device in violation of at least one of the one or more limitation parameters associated with access to the financial application; and
   halt access to the financial application for the first user device.

18. The non-transitory computer-readable storage medium according to claim 17 storing instruction that, when executed, cause the processor to generate the reevaluation element comprising testable content corresponding to the action by the first user device in violation of the at least one of the one or more limitation parameters.

19. The non-transitory computer-readable storage medium according to claim 15 storing instruction that, when executed, cause the processor to:
   provide the evaluation element to the first user device;
   determine completion of the evaluation element in an instance in which a responsive evaluation element is received from the first user device that satisfies a competency threshold; and
   determine failure of the evaluation element in an instance in which a responsive evaluation element is received from the first user device that fails to satisfy the competency threshold.

20. The non-transitory computer-readable storage medium according to claim 19 storing instruction that, when executed, cause the processor to prevent access of the first user device to the financial application in response to determining failure of the evaluation element.

* * * * *